United States Patent [19]
Travaglio

[11] 3,830,111
[45] Aug. 20, 1974

[54] GEARBOX HAVING A POWER TAKE-OFF SHAFT AND AUTOMATIC GEAR SELECTOR THEREFOR

[75] Inventor: Michele Travaglio, Turin, Italy

[73] Assignee: FIAT Societa per Azioni, Turin, Italy

[22] Filed: May 24, 1973

[21] Appl. No.: 363,690

[30] Foreign Application Priority Data
June 6, 1972 Italy .................................. 68784/72

[52] U.S. Cl. ............................... 74/15.4, 74/15.66
[51] Int. Cl. ......................................... F16h 37/04
[58] Field of Search .................... 74/15.4, 375, 15.66

[56] References Cited
UNITED STATES PATENTS

| | | | |
|---|---|---|---|
| 1,876,561 | 9/1932 | Brown | 74/15.4 |
| 2,305,927 | 12/1942 | Kummich | 74/375 |
| 3,279,275 | 10/1966 | Christie | 74/15.4 |
| 3,352,165 | 11/1967 | Lee | 74/15.4 |
| 3,464,277 | 9/1969 | Longshore | 74/15.4 |
| 3,507,372 | 4/1970 | Gilbertson | 74/15.4 |
| 3,675,497 | 7/1972 | Thomas | 74/15.4 |

*Primary Examiner*—Samuel Scott
*Assistant Examiner*—Allan Russell Burke
*Attorney, Agent, or Firm*—Sughrue, Rothwell, Mion, Zinn & Macpeak

[57] ABSTRACT

A gearbox having a power take-off shaft for driving auxiliary machinery, and a gear selector arrangement by means of which the speed of rotation of the take-off shaft can be controlled. The take-off shaft has a terminal flange for connection to selected different splined adaptor shafts by means of which coupling to input shafts of different auxiliary machines may be effected and the gear selector mechanism is controlled by a rod housed in a bore in the take-off shaft and moved automatically to different positions by an axial projection on the splined adaptor shaft as the adaptor shaft is fixed in position so that the appropriate gear ratio for each splined adaptor shaft is automatically selected when the adaptor shafts are interchanged.

2 Claims, 2 Drawing Figures

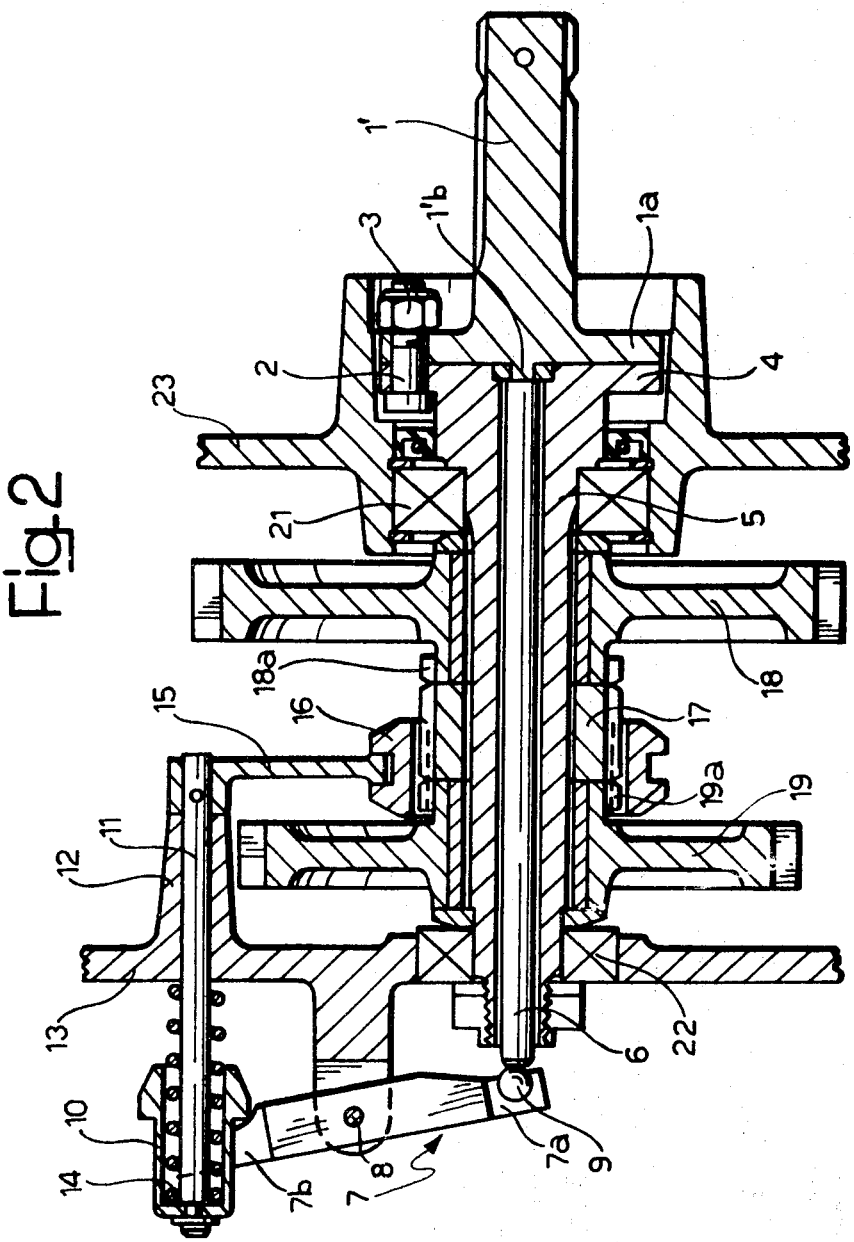

GEARBOX HAVING A POWER TAKE-OFF SHAFT AND AUTOMATIC GEAR SELECTOR THEREFOR

BACKGROUND OF THE INVENTION

The present invention relates to gearboxes having power take-off shafts, suitable for agricultural tractors and the like. Such power take-off shafts project from the gearbox and are used for driving auxiliary machinery from the engine of the tractor, the machinery being either stationary or towed behind the tractor.

Different types of machine which can be driven from the engine of the tractor require to be driven at different speeds and with different gear ratios, and to couple machines which are to be driven at any particular speed it is known to use a splined adaptor shaft of a particular size to comply with the requirements of fixed standards. Thus for each different size of splined adaptor shaft there corresponds a predetermined acceptable range of speeds of rotation of the power take-off shaft, and it is necessary to select a different gear to provide the required speed range each time a adaptor shaft is exchanged for one of a different size to couple a different machine to the power take-off shaft. In previously known such gear-boxes it has been left to the operator to remember which gear ratio to select for the take-off shaft for each adaptor shaft but this can lead to accidental over stressing of a adaptor shaft if the operator forgets or omits to select the appropriate gear.

OBJECTS OF THE INVENTION

One object of the present invention is to provide a gearbox of the above type in which changing a splined coupling adaptor shaft is simplified and in which the gear selector is automatically adjusted when different adaptor shafts are fitted, to prevent damage which could be caused by over-loading an undersize adaptor shaft if the operator should omit to change the position of the gearbox selector when a adaptor shaft is changed, or conversely, should omit to change the adaptor shaft when the gearbox selector is moved to provide a different output speed.

Another object of the present invention is to produce a gearbox of the abovementioned type in which the operations necessary for replacement of a adaptor shaft and selection of the appropriate speed are minimised and which is simple to produce, easy to use, and of high operational efficiency.

SUMMARY OF THE INVENTION

According to the present invention a gearbox suitable for an agricultural tractor or the like, having a power take-off shaft, gear selector means for adjusting the gear ratio of the take-off shaft with respect to the input shaft of the gearbox, and a plurality of interchangeable splined adaptor shafts attachable to a free end of the take-off shaft for coupling the take-off shaft to the input shaft of different machines to be driven thereby, is characterised in that the take-off shaft has an axial bore therethrough housing an axially movable rod one end of which engages a first arm of a pivoted rocker lever the other arm of which is coupled to a further axially movable rod which is connected to gear selector means the adjustment of which determines the gear ratio of the take-off shaft with respect to an input shaft of the gearbox in dependence on the axial position of the said rod in the bore in the take-off shaft, and in that each of the said interchangeable splined adaptor shafts carries an axial projection of a different length such that when a selected adaptor shaft is attached to the end of the take-off shaft the axial projection thereof extends into the said bore in the shaft to determine the axial position of the said rod housed therein and thus the adjustment of the gear selector means.

Further characteristics and advantages of the present invention will become apparent during the course of the following description, given by way of example only and without any restrictive nature.

BRIEF DESCRIPTION OF THE DRAWINGS

FIG. 2 is an axial section similar to FIG. 1, showing the same part of the embodiment, but in a second operational configuration.

DESCRIPTION OF THE PREFERRED EMBODIMENTS

Figure 1:
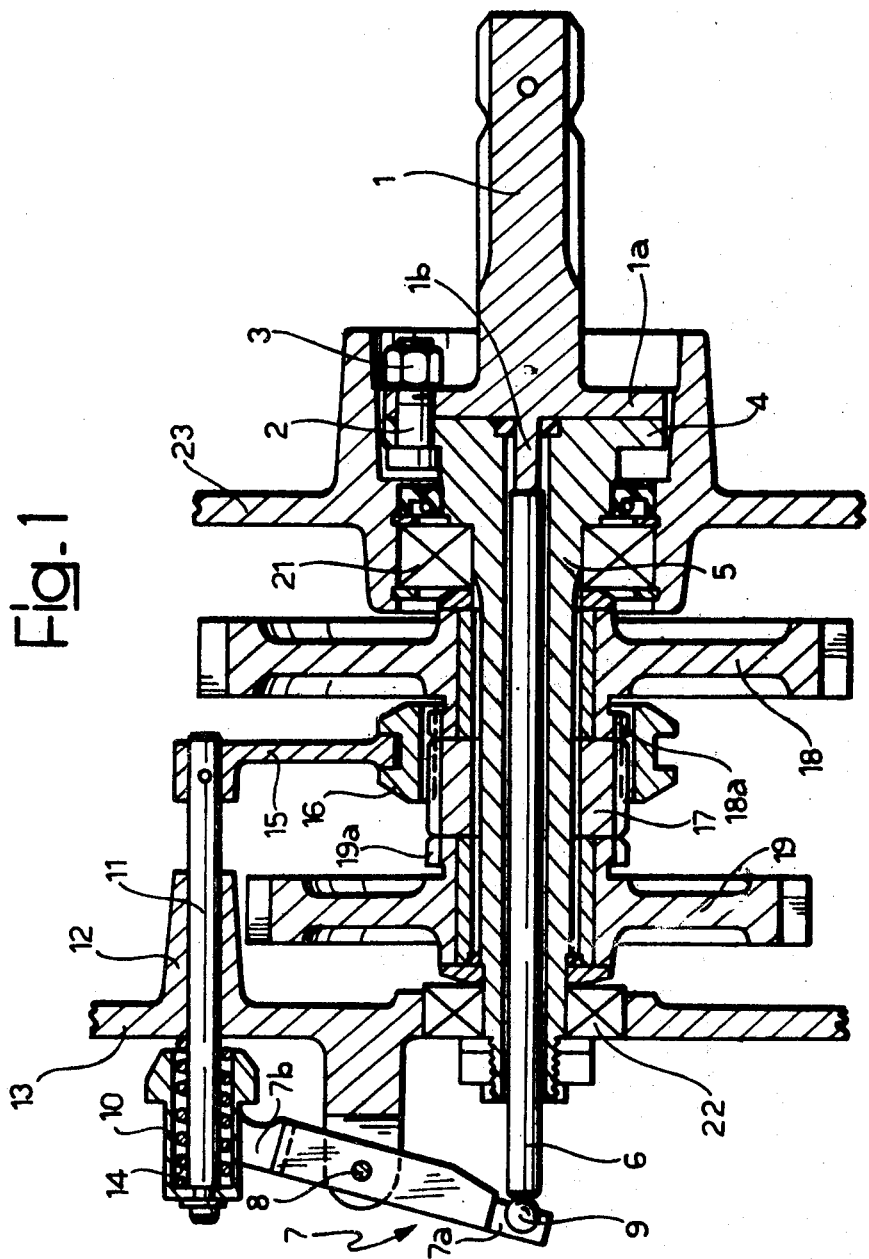
FIG. 1 is an axial section of a part of the embodiment, shown in one operational configuration.

Referring now to FIG. 1 of the drawings there is shown a splined adaptor shaft 1 having a radial flange 1a at one end thereof which is connected face to face with a similar radial flange at the end of a power take-off shaft 5 of a gear box for an agricultural tractor or the like. The shaft 5 is freely rotatably borne by bearings 21 and 22 in respective parts 13, 23 of a gearbox frame. The shaft 5 has a longitudinal bore which extends over its entire length. The coupling between the flange 4 of the shaft 5 and the flange 1a of the spigot 1 is made by axial bolts 2 and nuts 3 in the embodiment shown, although it will be appreciated that any other suitable coupling means may be used.

In the internal bore of the power take-off shaft 5 there is housed an axially movable rod 6 the inner end of which engages a ball 9 carried by an arm 7a of a rocker lever 7 pivoted intermediate its ends to a pivot 8 carried by the part 13 of the gearbox frame. The other arm 7b of the rocker lever 7 is connected by a swivel coupling to a cup-shaped coupling member 10 which surrounds a second rod 11 which is axially movable in a hollow boss 12 of the frame part 13 and which lies substantially parallel to the shaft 5. Surrounding the rod 11 and within the cup 10 there is a spring 14 which biases the rod 11 to the left of FIG. 1. At the other end of the rod 11 there is a control fork 15 engaged in an annular peripheral groove in an internally toothed movable sleeve 16 which constitutes the speed selector device. The sleeve 16 is slidably engaged on a gear wheel 17 mounted for rotation with the power take-off shaft 5 and is movable between positions where it also engages the teeth 18a or 19a of two gear wheels 18 and 19 which are freely rotatably mounted on the shaft 5 but which are connected by peripheral teeth so as to be driven via other gear wheels (not shown) of the gear box. The gear wheels 18 and 19 are of different diameters and are thus driven at different rotational speeds by the gearbox.

The axial position of the movable control rod 6 is determined by the length of an axial projection 1b carried by the splined adaptor shaft 1. Different adaptor shafts are provided with such projections having different lengths. For example, when a adaptor shaft 1 such as that shown in FIG. 1 is mounted on the take-off shaft 5, the projection 1b, which is relatively long causes axial movement of the rod 6 to the left of FIG. 1 consequently pivoting the lever 7 to the position shown and causing movement of the second rod 11 to move the sleeve 16 so as to couple the gear wheel 17 with the gear wheel 18 so that the power take-off shaft 5 will be driven at a relatively lower speed, as required by the type of adaptor shaft employed.

When the adaptor shaft 1 is removed from the shaft 5 the spring 14 urges the cup 10 to move to the left of the drawing rocking the lever 7 in a counterclockwise direction; this causes the main control rod 6 to move to the right of the drawing until this movement is stopped by the control fork 15 abutting the hollow boss 12 of the frame part 13. If, subsequently, a splined adaptor shaft having a relatively short projection is bolted to the flange 4 of the shaft 5, the rod 6 will remain in the position to which it is biased by the spring 14. This situation is illustrated in FIG. 2 where it will be seen that the projection 1'b of the adaptor shaft 1' merely abuts the end of the rod 6 without displacing it. In this position the sleeve 16 interconnects the toothed wheel 17 and the teeth 19a on the gear wheel 19 so that the take-off shaft 5 is driven at a relatively higher speed since the gear wheel 19 is smaller than the wheel 18 via which the shaft 5 is driven when the fork 15 is in the other position.

Thus selection of the speeds is effected automatically and is controlled directly by the act of changing the adaptor shaft used for coupling to the machinery to be driven. This avoids any possibility of errors or confusion by the operator. Since each adaptor shaft will have a projection of the required length, the output speed of the power takeoff shaft 5 cannot be different from that which has been determined as appropriate for that type of adaptor shaft.

I claim:

1. In a gearbox suitable for an agricultural tractor or the like, of the type having a power take-off shaft for coupling to auxiliary machinery to be driven via said gearbox, gear selector means for selecting the gear ratio between said power take-off shaft and an input shaft of said gearbox to adjust the speed of rotation of said take-off shaft with respect to said input shaft, and a plurality of interchangeable splined adaptor shafts attachable to the free end of said power take-off shaft for coupling said power take-off shaft to the input shafts of different machines to be driven via said gearbox, the improvement comprising, said power take-off shaft being provided with an axial bore extending entirely therethrough, an axially movable rod housed in said axial bore in said power take-off shaft, a rocker lever housed within said gearbox and pivotally mounted at a position intermediate its ends on a fixed frame part of said gearbox and having first and second arms, said first arm of said rocker lever engaging the inner end of said rod housed in said axial bore in said power take-off shaft, a second axially movable rod slidably housed on a fixed frame part of said gearbox, one end of said second axially movable rod engaging said second arm of said rocker lever and the other end of said rod engaging said gear selector means of said gearbox such that the gear ratio selected thereby depends on the angular position of said rocker lever and thus on the axial position of said rod housed in said bore in said power take-off shaft, and said interchangeable splined adaptor shafts having axial projections thereon of different lengths whereby when a selected adaptor shaft is attached to said power take-off shaft said axial projections thereof extends into said bore in said power take-off shaft to determine the position of said rod housed therein and thus to determine the gear ratio selected by said gear selection means.

2. The gearbox of claim 1 wherein said second axially movable rod carries fixed to one end thereof a cup shaped connector member which surrounds a spring biasing said second rod to a first position thereof, said cup shaped connector member being coupled to said second arm of said pivoted rocker lever by a swivel coupling.

* * * * *